United States Patent Office.

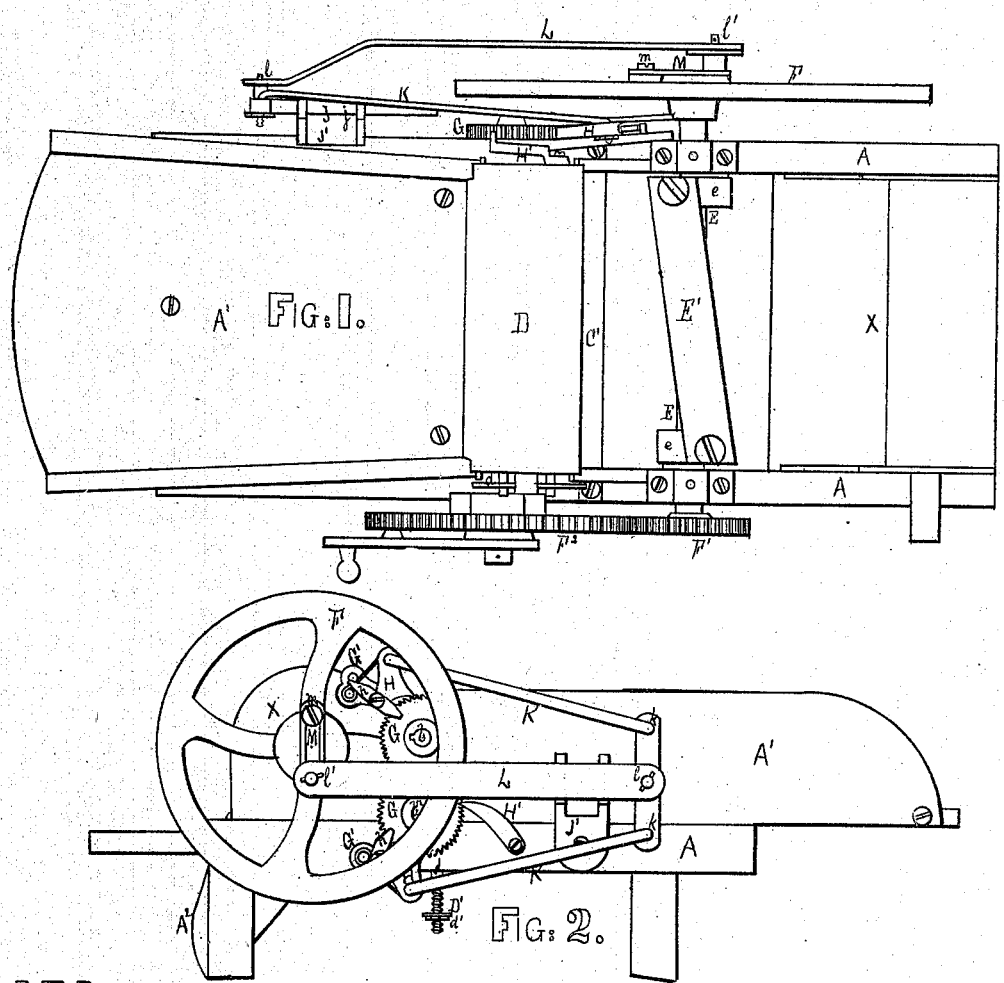

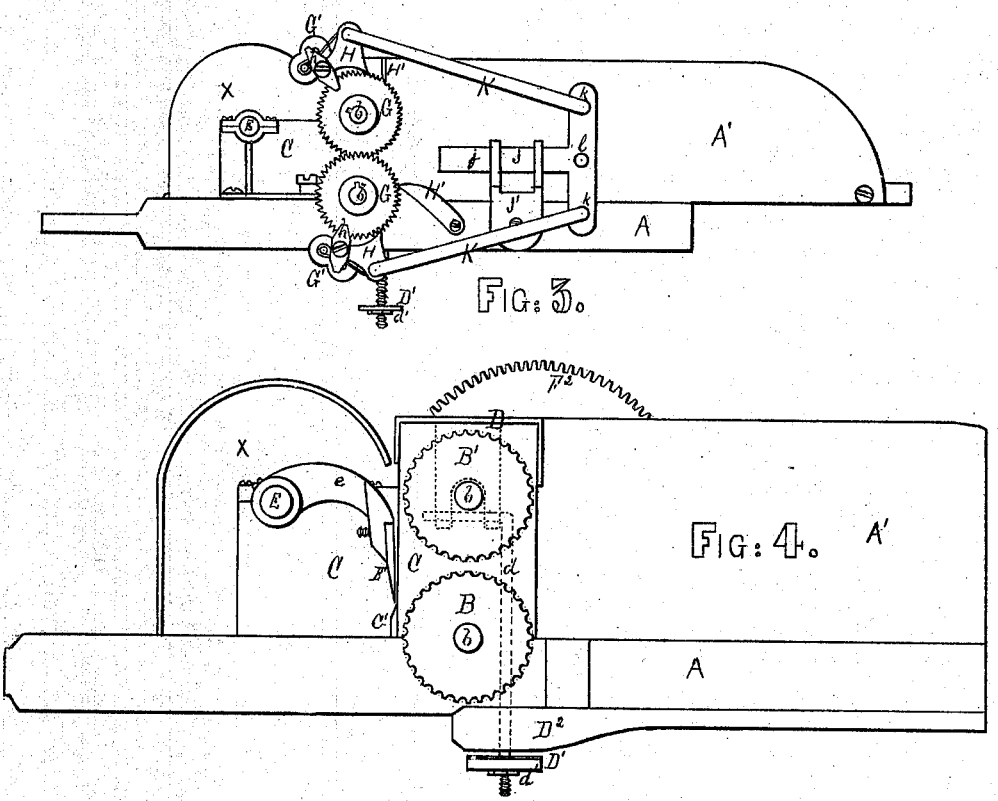

JAMES B. McCLINTON AND WILLIAM McCLINTON, OF GALION, OHIO.

Letters Patent No. 112,265, dated February 28, 1871.

IMPROVEMENT IN FEED-CUTTERS.

The Schedule referred to in these Letters Patent and making part of the same.

*To all whom it may concern:*

Be it known that we, JAMES B. MCCLINTON and WILLIAM MCCLINTON, of Galion, in the county of Crawford and State of Ohio, have invented certain new and useful Improvements in Straw and Fodder-Cutters; and we do hereby declare that the following is a full, clear, and exact description of the same, reference being had to the accompanying drawing and to the letters of reference marked thereon making part of this specification, in which—

Figure 1 is a top plan view.

Figure 2 is a side view, with the fly-wheel attached.

Figure 3 is a side view, with the fly-wheel removed.

Figure 4 is a longitudinal sectional view through the center of the machine.

This invention belongs to that class of straw and fodder-cutters in which a revolving knife or blade, working over a stationary bar, is used, and consists in a novel arrangement of mechanism, whereby the straw or fodder is not only uniformly fed for the action of the knives, but in which the feed mechanism is capable of such adjustment as insures the cutting of the straw or fodder of a greater or lesser length, as occasion may require.

The lower roller revolves in stationary bearings, while the upper has its bearings in a guide-slot, being retained in position by means of a metallic cap, rods, and spring, so arranged that while a slight vertical play is allowed its axle, the tension of the spring shall be constantly exerted in drawing it to and retaining it in such a position as to cause it to so bite or press the substance to be cut as to insure it being properly fed to the knives.

Our invention also consists in the combination and arrangement of the mechanism by which a simultaneous and uniform or like movement is imparted to the feed-rollers; and this we accomplish by means of ratchet-wheels secured on their axles or shafts, and spring-pawls or dogs, the latter being connected by pitman-rods with the short arm of a T-shaped lever, the long arm of which has its bearings and slides in guide-boxes secured to the side of the cutting-box or frame.

This T-shaped lever is so connected with the fly-wheel by a rod or bar-plate that the revolution of the wheel shall cause the lever to move or slide to and fro in a horizontal line or in a horizontal direction.

This connecting-bar or rod that unites the fly-wheel and the T-shaped lever is permanently secured to the latter at or on a pivot-center, and to the wheel by means of a slotted plate or coupling-link and a set-screw.

This arrangement affords a complete system of adjustment for the feed mechanism, and one by which it can be regulated at pleasure.

As the movement of the rollers depends entirely on this connecting-rod, of course the speed or rate at which they feed is controlled entirely by its point of bearing on the fly-wheel. Therefore, to vary the cut of the machine, or to cause it to cut the straw or fodder of a greater or lesser length, you simply have to change the point at which the connecting-rod has its bearing on the fly-wheel, and which is done by moving the slotted bar or coupling-link so as to carry the end of the connecting-bar further from or bringing it nearer to the axle of the wheel, as the case may be, or the length of cut desired may require.

When the ratchet-wheels are moved forward by the spring-pawls or dogs they are held in their place and prevented from returning by retaining-pawls or dogs, while the spring-pawls or dogs are themselves prevented from slipping or being thrown out of direct contact with the ratchet periphery of the wheels by means of the plates on which they have their bearings and pendent-lips secured to the pawl.

To enable others skilled in the art to make and use our invention, we will now proceed to describe its construction and operation.

A is the frame;

$A^1$, the cutting-box; and $A^2$, the spout or chute for the cut-straw to run down, all of which are constructed in the usual manner.

B B' are the feed-rollers, and their entire surface is finely fluted.

These rollers, B B', are each provided with an axle-shaft, $b$, and are supported in cast-metallic bearing-plates, C C, secured to the frame A on its opposite sides, and at the discharge end of the feed box.

The shaft $b$ of the lower roller B is secured in fixed bearings, while the shaft $b$ of the roller B' is secured in a metallic cap, D, and rests in an open slot in the plates C C.

$d\ d$ are two vertical rods, supported in ears on the cap D, which are arranged at such point on the side flanged-plate thereof that when the roller B' is inserted its shaft rests on the right-angled head of the rods.

These rods $d\ d$ have screw-threads cut on the lower end of their shanks, and pass down through openings in the frame.

$D^1$ is a spring, attached to the rods $d\ d$, and is retained thereon by means of nuts $d'\ d'$.

This cap consists of a plate flanged around its entire surface, the end flanges being slotted, as stated, for receiving and securing the shaft $b$ of the roller B', and is so arranged, as it were, to act as a guide-casing for the roller, not only partially protecting the same from dust, as an ordinary rectangular plate would do, but serving as a guide, not only readily enabling the roller to accommodate itself to any thickness or unevenness of material fed, but, at the same time, inclosing it, as it does, always retaining the roller on the true line of its work.

To this cap is also secured the retaining-pawl H' of the ratchet-wheel, which is secured to the shaft of the feed-roller B', and which is consequently moved exactly as is the roller, always being in position to act effectively on its ratchet.

The center or arch of the bow of this spring D¹ rests against a horizontal arm or bar, D², secured on the frame.

By this arrangement the tension or power of the spring is constantly exerted in drawing the roller B' in such contact with the roller B as to insure that they shall so press or bite the straw or fodder as to secure a proper feeding of the same to the knives.

On the plates C C, and in front of the rollers B B', in suitable bearings, rests and works the shaft E.

To this shaft E are keyed, by clamping jaws, the arms e e, to which the knife or blade E' is attached.

This blade is so arranged as to work in connection with the stationary bar or knife C¹, which is also secured in the bearing-plates C C.

X is a hinged metallic cap that incloses the knives, and is simply to guard against or prevent accident.

On the opposite ends of the shaft E are secured the fly-wheel F and the pinion-wheel F¹.

This pinion-wheel F¹ meshes with the main or driving-ratchet crank-wheel F², from which the power is received that operates not only the knife but the entire feed mechanism.

The main or driving-wheel F² works on an independent bearing fastened to the frame A.

G G are two ratchet-wheels, and are permanently secured on the shafts b b of the feed-rollers B B'.

G' G' are two bearing-plates, and are also secured on the shafts.

These plates G' G' are secured immediately in front of the inner face of the ratchet-wheels, and are attached in such manner as to allow of their free movement.

To these plates are secured the spring-pawls or dogs H H, which work the ratchet-wheels G G, and through them the feed-rollers B B'.

h h are two pendent lips, and are bolted onto the pawls or dogs H H.

These project down on the outside of the wheels G G, and, in connection with the plates G' G', which extend up on the inner surface of the wheels, prevent the pawls or dogs from slipping off the wheels G G or falling out of direct contact with the ratchet peripheries thereof.

H' H' are two dogs or retaining-pawls, one secured to the cap D, as before stated, and the other to the frame A.

These hold the ratchet-wheels, and prevent any backward movement of the rollers after they have been carried forward through the action of the pawls or dogs H H.

J is a T-shaped motor-lever, the long arm j of which is supported and so secured in a guide-box, J', attached to the frame A, as to allow of its freely sliding backward and forward in a horizontal direction.

In eyes, k k, at the ends of the short, or, when secured in the guide-box, the vertical arm of this lever, are attached pitman-rods, K K.

These pitman-rods K K connect the T-shaped lever with the pawls or dogs H H, and are the medium through which the motion of the one is communicated to the other.

This T-shaped lever is connected to the fly-wheel by means of a bar or plate, L.

This bar or plate is attached to the lever on a pivot center, l, and which is immediately at the point of union between its long and short arm.

The other end of this bar is secured to a wrist-pin, l', on a slotted plate or link M.

This plate or link M enters a groove or recess on the face of the fly-wheel F, and is secured or fastened at any desired point along its entire surface by means of a screw, m.

The operation is as follows:

Power being applied to the crank-wheel F², in consequence of its meshing with the pinion-wheel F¹, that wheel is revolved, carrying with it the shaft E, the knife E', and fly-wheel F. This revolution of the fly-wheel, through the connecting-bar or plate L, imparts a horizontal or sliding movement to the T-shaped lever J, which, through the pitman-rods K K, work the pawls or dogs H H, and which, turning the ratchet-wheels G G, revolve simultaneously the rollers B B', which, biting the straw or fodder, feed it for the action of the knife. Now, the cut of the machine depending, as it does, entirely on the length of the stroke of the bar or plate L, we can vary it at pleasure simply by shifting the point at which the link M is secured in the groove on the fly-wheel F. Therefore, when we desire to alter the cut, or cut the straw or fodder of either a greater or lesser length than that at which the machine is set, we have simply to loosen the screw m and move the link M in the groove, so as to bring the end of the rod nearer to or remove it further from the axle E of the fly-wheel, as the case may be.

We are aware that prior to our invention the connecting-bar has been attached to the fly-wheel by an adjustable bearing, whereby the length of its stroke could be regulated; therefore we do not desire to be understood as broadly claiming this feature *per se*.

Having thus fully described our invention,

What we claim therein as new, and desire to secure by Letters Patent of the United States, is—

1. The rollers B B', plates C C, cap D, having a retaining pawl or dog, H', attached, rods d d, and spring D¹, when the same are combined and arranged substantially as described.

2. The T-shaped lever J, pitman-rods K K, dogs H H, ratchet-wheels G G, and connecting-bar L, secured to the fly-wheel as stated, when the same are so combined and arranged as to impart to the feed-rollers an adjustable and uniform movement, substantially as described.

In testimony whereof we have signed our names to this specification in the presence of two subscribing witnesses.

JAMES B. McCLINTON.
Witnesses:    WILLIAM McCLINTON.
 S. G. CUMMINGS,
 M. McCLINTON.